(12) United States Patent
Lu (10) Patent No.: US 7,203,242 B2
(45) Date of Patent: Apr. 10, 2007

(54) CODE RATE ADAPTIVE ENCODING/DECODING ARRANGEMENT AND METHOD FOR A PULSE CODE MODULATION SYSTEM

(75) Inventor: Wei-Fan Lu, Taipei (TW)

(73) Assignee: Elan Microelectronics Corporation, Hsinchu (TW)

( * ) Notice: Subject to any disclaimer, the term of this patent is extended or adjusted under 35 U.S.C. 154(b) by 754 days.

(21) Appl. No.: 10/422,768

(22) Filed: Apr. 25, 2003

(65) Prior Publication Data

US 2003/0202609 A1    Oct. 30, 2003

(30) Foreign Application Priority Data

Apr. 26, 2002    (TW)    ............... 91108812 A (51) Int. Cl.
  H04B 14/04    (2006.01)
  H03M 7/34    (2006.01)
  H03M 7/38    (2006.01)
  H03M 7/40    (2006.01)
  G08C 19/12    (2006.01)

(52) U.S. Cl. .................. 375/243; 375/253; 341/51; 341/67; 341/182

(58) Field of Classification Search ........... 375/242, 375/243, 245, 246, 253; 382/251, 252; 341/95, 341/51, 67, 182
See application file for complete search history.

(56) References Cited

U.S. PATENT DOCUMENTS

| | | | |
|---|---|---|---|
| 5,317,397 A * | 5/1994 | Odaka et al. | 375/240.15 |
| 6,259,739 B1 * | 7/2001 | Kondo | 375/240.23 |
| 2002/0118953 A1 * | 8/2002 | Kim | 386/70 |
| 2002/0138794 A1 * | 9/2002 | Kikuchi et al. | 714/707 |

* cited by examiner

Primary Examiner—Khai Tran
Assistant Examiner—Aslan Ettehadieh
(74) Attorney, Agent, or Firm—Rosenberg, Klein & Lee (57) ABSTRACT

A code rate adaptive encoding/decoding arrangement and method for a pulse code modulation system comprises a code rate adaptor and a code capacity meter to dynamically produce a code rate adaptive signal for the code length of the pulse code modulation adaptive to actual situations during the encoding/decoding process.

46 Claims, 12 Drawing Sheets

CODE RATE ADAPTIVE ENCODING/DECODING ARRANGEMENT AND METHOD FOR A PULSE CODE MODULATION SYSTEM

FIELD OF THE INVENTION

The present invention relates generally to a pulse code modulation (PCM) arrangement and method, and more particularly to a code rate adaptive encoding/decoding arrangement and method for a pulse code modulation system.

BACKGROUND OF THE INVENTION

Figure 1:
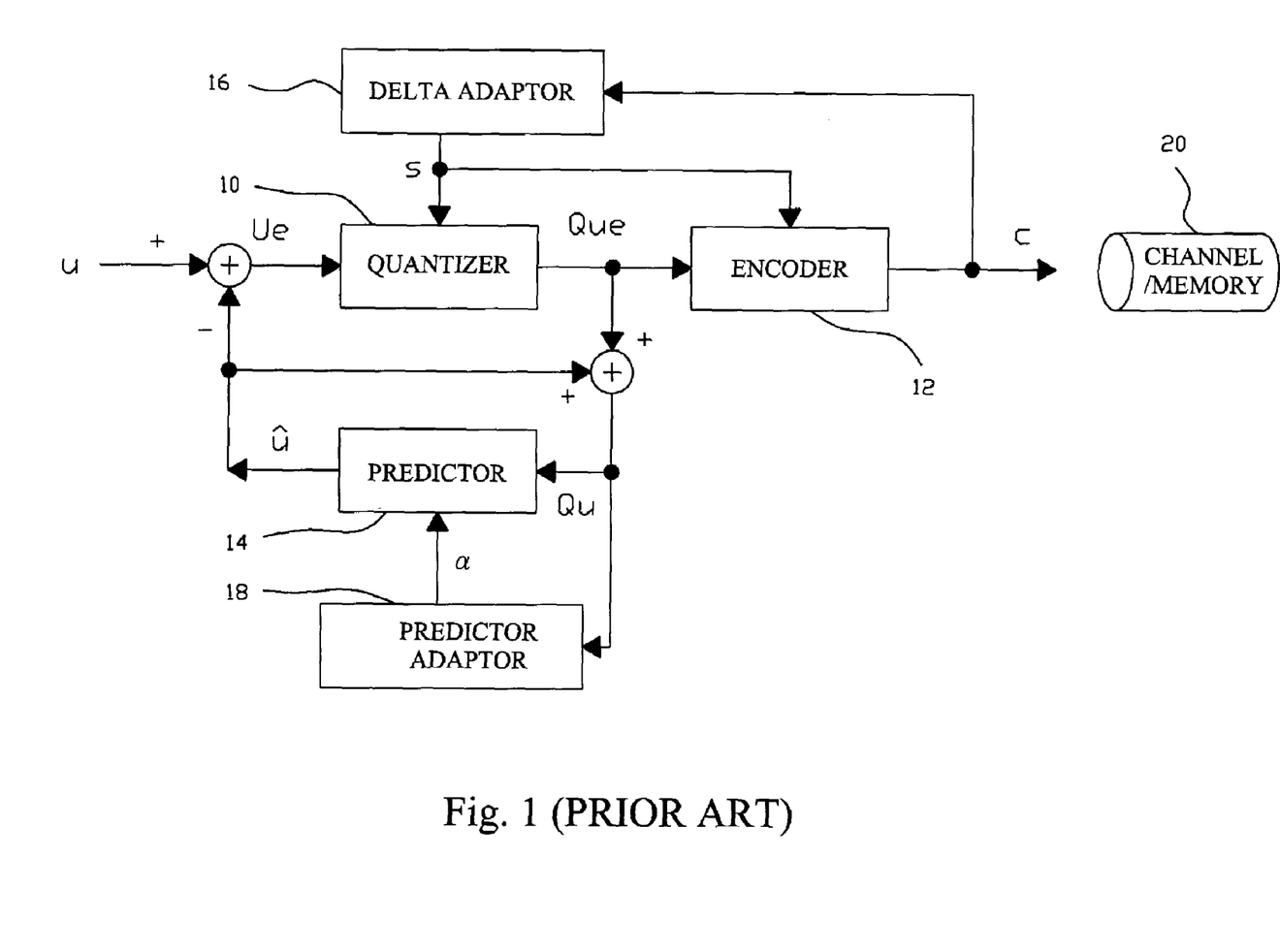
FIG. 1 shows a system block diagram to illustrate a typical ADPCM encoder arrangement.
Figure 2:
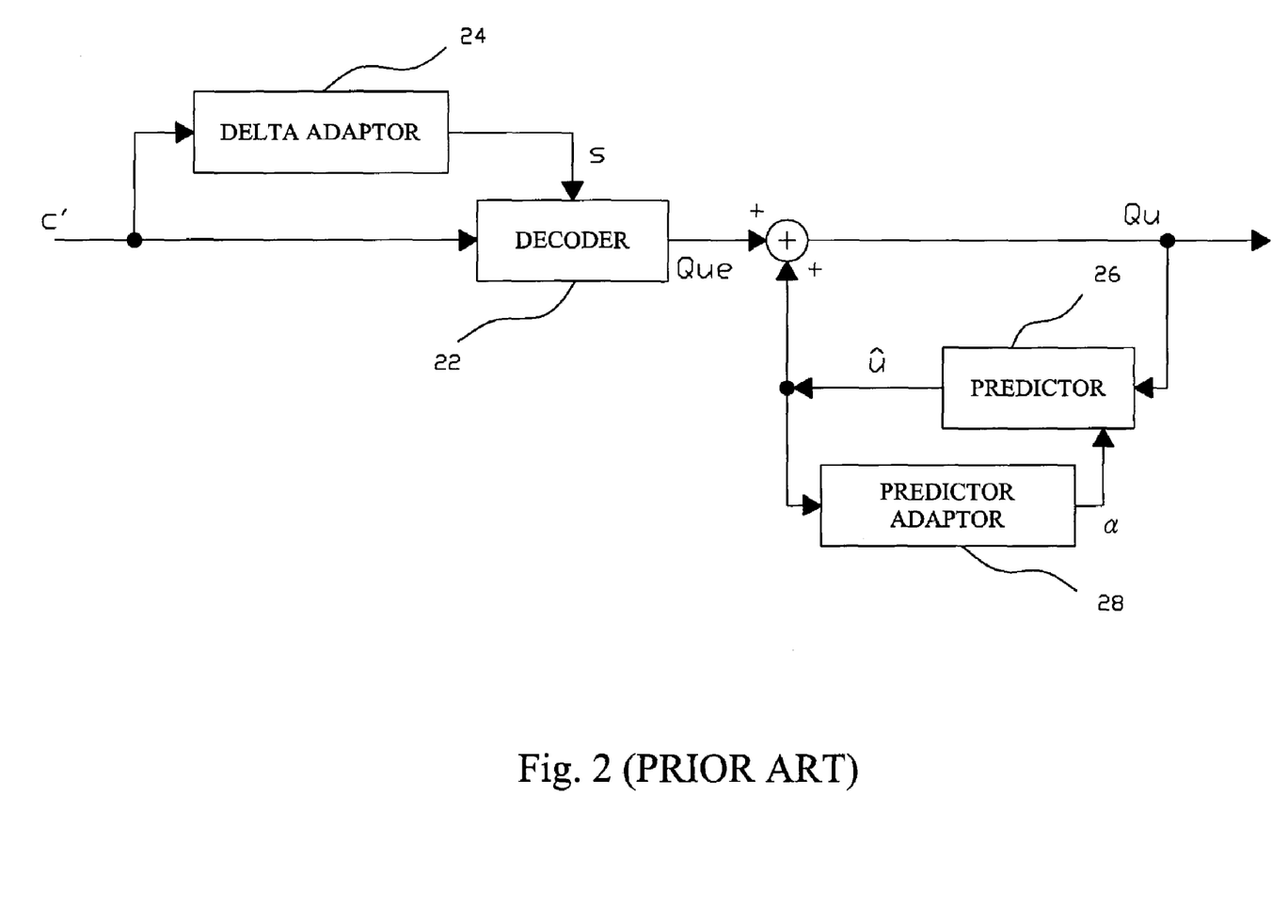
FIG. 2 is a system block diagram of a conventional ADPCM decoding arrangement.

PCM is well known for processing of digital signals and operations of digital systems. Differential PCM (DPCM) is also well known to decrease distortion of signal quantification and reduce code capacity of digital encoding. Further, adaptive DPCM (ADPCM) is also well known to improve efficiency and quality of signal processing by dynamically adjusting the quantification scale depending on the signal variations. FIG. 1 shows a system block diagram to illustrate a typical ADPCM encoder arrangement in which a quantizer 10 quantizes the prediction error Ue from an input u subtracting a prediction u to be a quantized prediction error Que and an encoder 12 encodes the quantized prediction error Que to be a code signal c. The quantized prediction error Que and the prediction û are added to be a quantized signal Qu for the input of the predictor 14 to produce the prediction û. The code signal c from the encoder 12 is sent to channel/memory 20. The quantizer 10, predictor 14 and encoder 12 form a DPCM encoder arrangement. An ADPCM encoder arrangement further comprises a delta adaptor 16 and a predictor adaptor 18 to regulate the step size of quantification. By monitoring the code signal c, the delta adaptor 16 produces a step size adaptive signal s for the quantizer 10 and encoder 12. On the other hand, the predictor adaptor 18 produces a predictor factor α by monitoring the quantized signal Qu for the predictor 14 adaptive to various situations. FIG. 2 is a system block diagram of a conventional ADPCM decoding arrangement, in which the code signal c' received at receiver is connected to a decoder 22 and a delta adaptor 24 to produce a step size adaptive signal s for the decoder 22. The quantized prediction error Que decoded by the decoder 22 is added with a prediction û from a predictor 26 to be a quantized signal Qu. The quantized signal Qu is connected to the predictor 26 to produce the prediction û, and a predictor adaptor 28 produces a predictor factor α by monitoring the prediction û for the predictor 26. A resolution modulator is further incorporated into a DPCM or ADPCM system in Taiwanese Pat. Issued No. 453408 to adjust the encoding resolution based on the output s of the step size adaptor and the quantized prediction error Que.

However, these prior arts only consider the quality of the processed signal itself or the code signal after encoding/decoding, i.e., simply have thought of the variations of signals, without considering other assisted resource. For example, the encoded code is usually buffered by memory before decoding, so that the buffer ability to input signal flow variations will effect the entire performance of the system. Generally, better signal quality could be obtained with longer code length, but it will worsen the response ability of a system to signal variations. For example, when using a CD-ROM drive, if it keeps longer code length or better signal quality, the music or video will be interrupted once the input signal flow of the buffer memory decreased or interrupted by vibration. The larger code capacity is stored in buffer memory, the more variations of input flow can be absorbed. Therefore, the variations of code capacity should be taken into considerations to improve the system performance.

SUMMARY OF THE INVENTION

Accordingly, it is an object of the present invention to provide a code rate adaptive encoding/decoding arrangement and method for a pulse code modulation system to optimize the system by automatically adjusting the code length in response to actual situations during the encoding/decoding process.

In an encoding arrangement including a quantizer, a predictor and an encoder, according to the present invention, there is further included a code rate adaptor referring to the prediction from the predictor or the quantized prediction error from the quantizer and/or a code capacity indication provided by a code capacity meter to produce a code rate adaptive signal for the quantizer and encoder to dynamically adjust the code length thereof. On the other hand, in a decoding arrangement including a decoder and a predictor, a code rate adaptor referring to the prediction from the predictor or the quantized prediction error from the decoder and/or a code capacity indication produces a code rate adaptive signal for the decoder.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
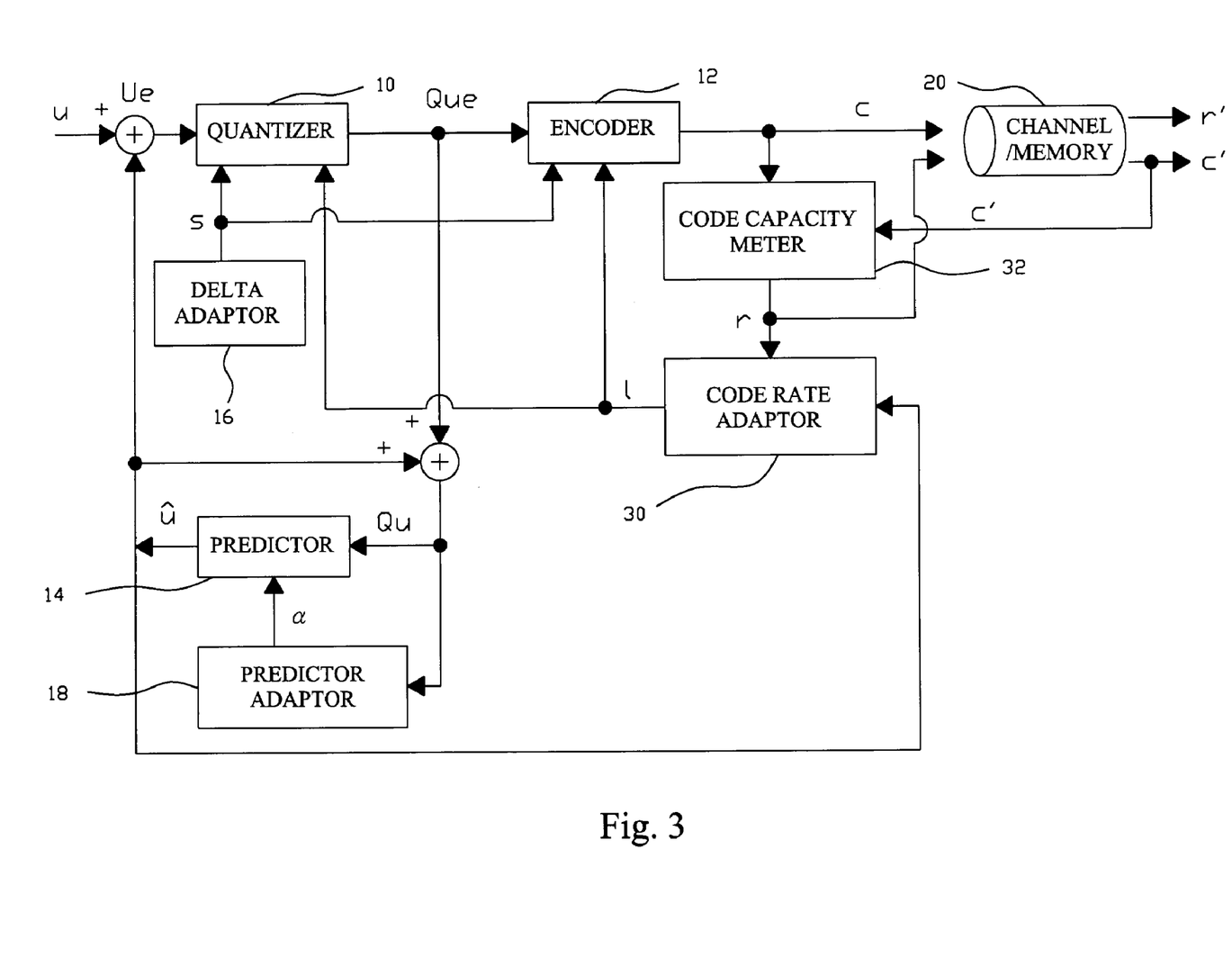
FIG. 3 is an encoder arrangement according to the present invention.

FIG. 3 is an encoder arrangement according to the present invention. As in a well known ADPCM, the encoder arrangement comprises a quantizer 10, an encoder 12, a predictor 14, a delta adaptor 16 and a predictor adaptor 18.

To properly regulate the code length, a code rate adaptor 30 provides a code rate adaptive signal l for the quantizer 10 and encoder 12, and the regulation of the code length is dynamical and automatic. The code rate adaptor 30 has its input connected with the output of the predictor 14, according to the prediction û, to produce a code rate adaptive signal l that is representative to the value or difference of the code length for the quantizer 10 and encoder 12 to regulate the code length. The encoder arrangement further includes a code capacity meter 32 to monitor the code signal c from the encoder 12 and a receiver code signal c'. The receiver code signal c' is the code signal received at the other side of the channel/memory 20 when the transmitter and receiver are both in a same system, for example, the code signal c is written into the local memory and the code signal c' is read from the local memory. While the receiver is far away from the transmitter, the code signal c' is the signal sent back from the receiver. The code capacity meter 32 compares the code signals c and c' to produce a code capacity indication r for the code rate adaptor 30 to regulate the code length according to the current code capacity conditions. The code capacity indication r is also sent into the channel/memory 20, along with the code signal c sent to the receiver.

Figure 4:
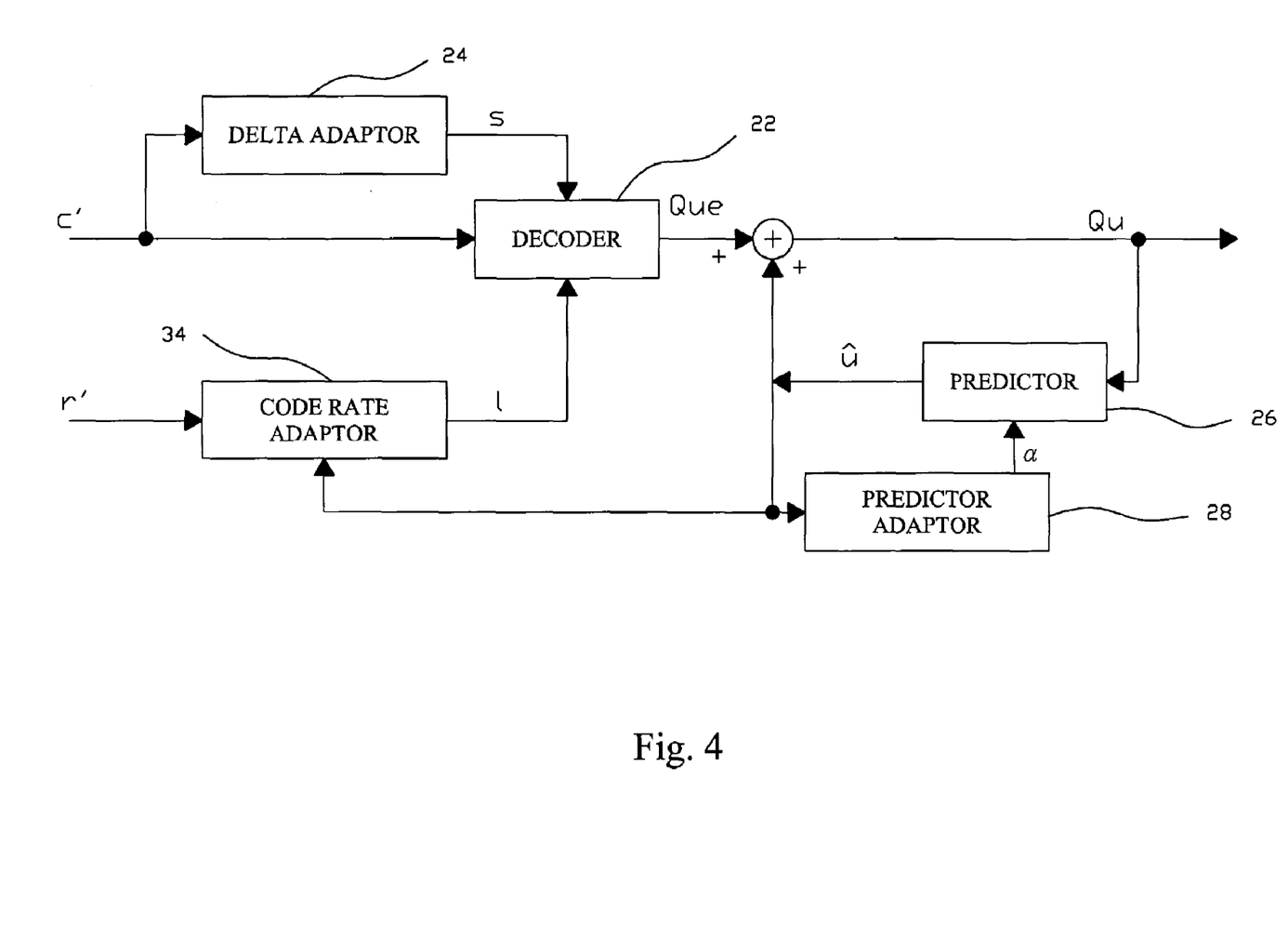
FIG. 4 is a decoder arrangement according to the present invention.

The decoding arrangement at the receiver is shown in FIG. 4. As in a well known ADPCM decoding arrangement, the invented decoding arrangement comprises a decoder 22, a delta adaptor 24, a predictor 26 and a predictor adaptor 28. Further, a code rate adaptor 34 receives the code capacity indication r' and refers to the prediction û from the predictor 26 to produce a code rate adaptive signal l for the decoder 22 to recover the quantized prediction error Que.

Figure 5:
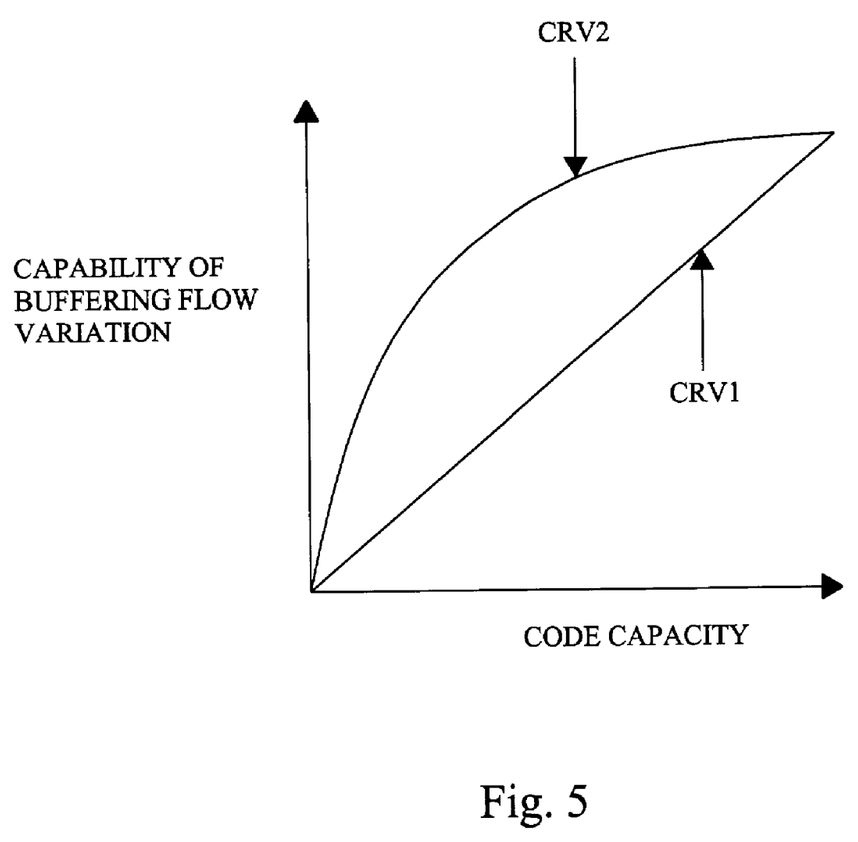
FIG. 5 shows the performance curves for comparison of the invented system with prior arts.

The embodiments in FIGS. 3 and 4 are mostly provided for the applications of an unstable or probably interrupted input signal flow) such as CD-ROM drive. The code capacity meter 32 counts the code capacity stored in the system by buffer memory and produces the code capacity indication r, and then the code rate adaptor 30 determines the most suitable code length according to the prediction u and the situation of code capacity. For example, when the code capacity is small, the most consideration is the capability of buffering the input flow difference, and using shorter code length to strengthen the capability of buffering the input flow difference; on the other hand, when the code capacity is large, the most consideration is the capability of optimizing signal quality and code utilization, and using longer code length to improve the signal quality. FIG. 5 shows the performance curve of the system. In FIG. 5, x-axis is code capacity and y-axis is the capability of buffering flow difference. The performance of prior arts as CRV1 shows is a straight line, and the performance of the present invention as CRV2 shows is a more superior curve. In general applications, if the input signal flow is more stable, the arrangement could be simplified by controlling the quality of output signal and increasing code utilization without considering code capacity.

Figure 6:
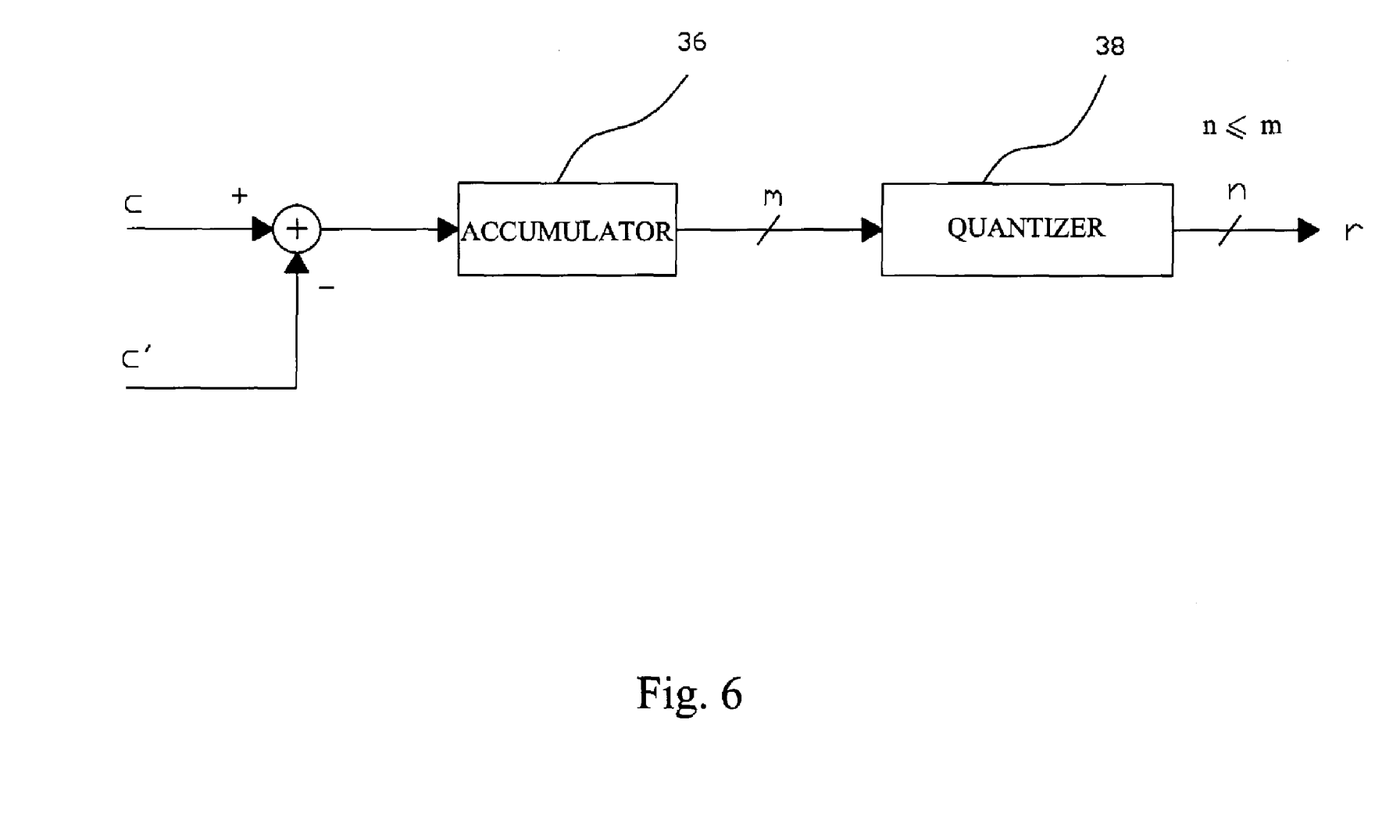
FIG. 6 shows the construction of a code capacity meter according to the present invention.

FIG. 6 shows the construction of a code capacity meter 32, which includes an accumulator 36 connected with the difference of the code signals c and c' to produce an accumulated signal. In other words, it counts the code byte stored in buffer memory, and according to that to produce the code capacity indication r. The code capacity indication r can be further quantized with a moderate accuracy by a quantizer 38, if considering the cost of implemented hardware.

Figure 7:
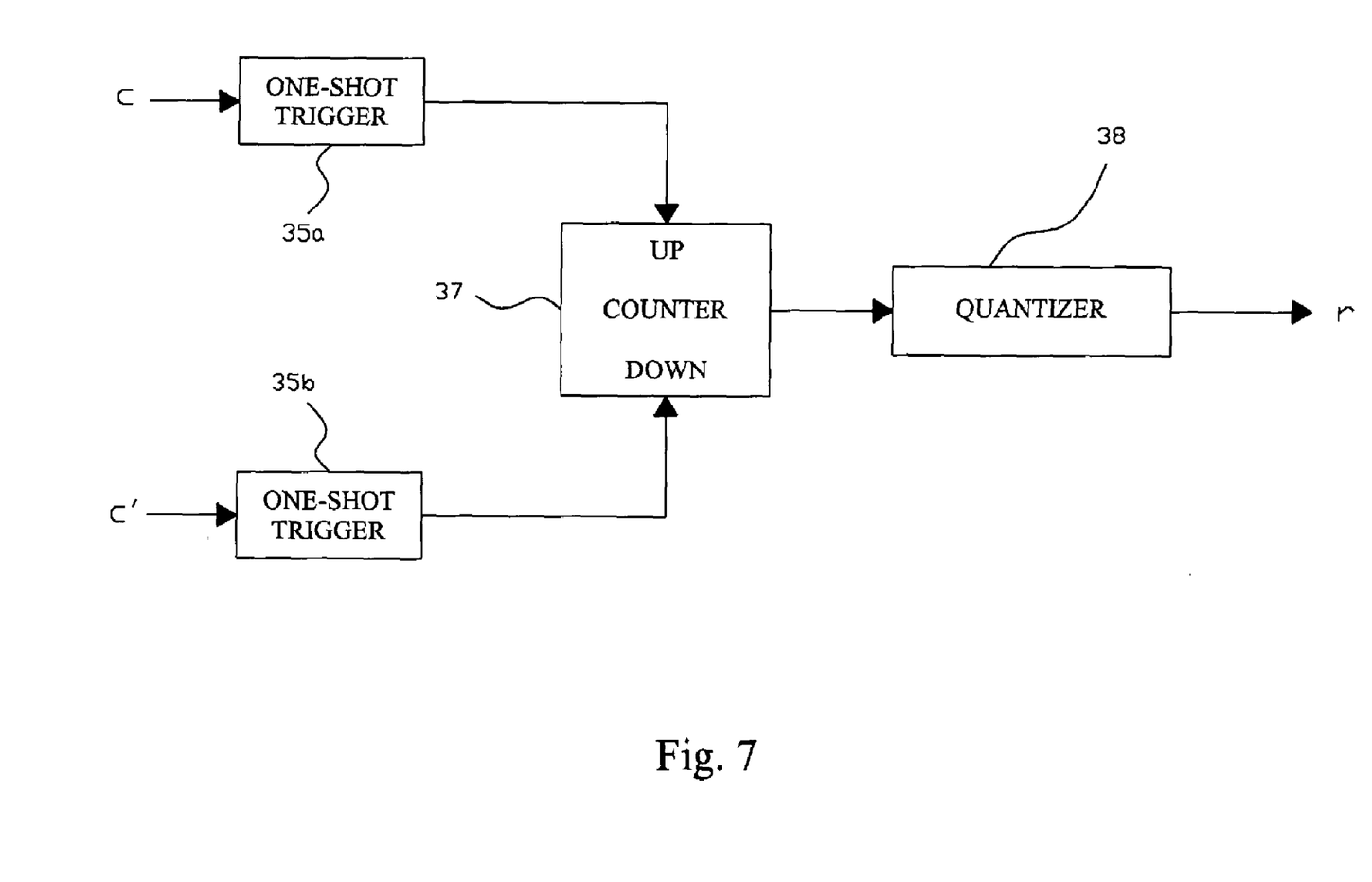
FIG. 7 shows the construction of another code capacity meter according to the present invention.

Another embodiment code capacity meter 32 is shown in FIG. 7, by which the code signals c and c' are connected to one-shot triggers 35a and 35b, respectively, for a counter 37 to count up and down, and thus the number difference between encoding and decoding is counted. It can not only reduce the cost of implemented hardware, but also directly respond the number of signal stored in buffer memory. Likewise, the code capacity quantizer 38 quantizes the output of the counter 37 to produce the code capacity indication r.

Figure 8:
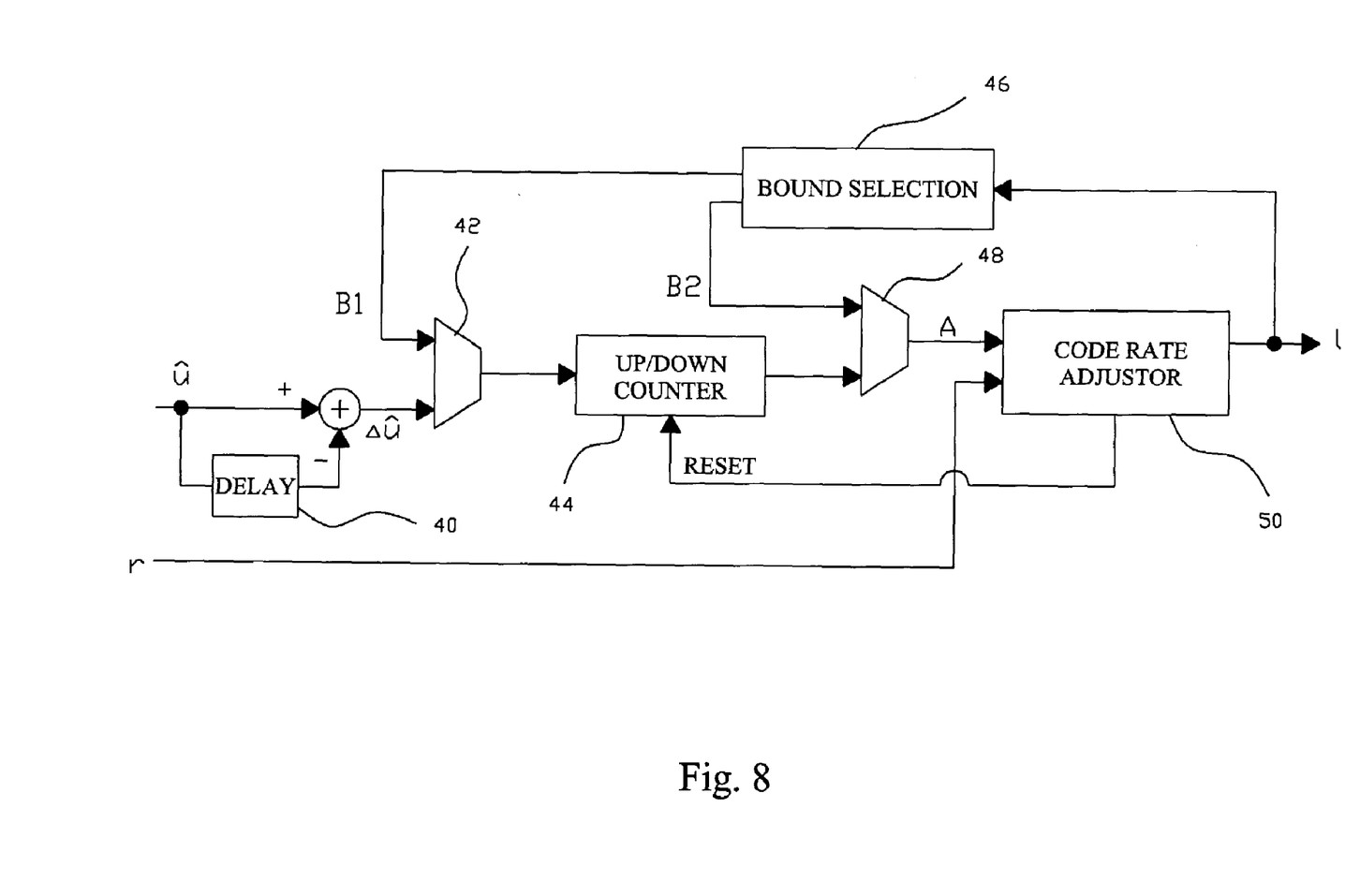
FIG. 8 shows the construction of a code rate adaptor according to the present invention.

FIG. 8 shows the construction of a code rate adaptor 30, in which the difference Δû between the prediction û and its delay by passing a delay unit 40 is sent to a comparator 42 to be compared with a bound B1 from a bound selection 46 to produce a signal for an up/down counter 44. Then the output of the counter 44 is further sent to another comparator 48 to be compared with another bound B2 from the bound selection 46 to thereby produce an adjustment indication A for the code rate adjustor 50. The latter refers to the code capacity indication r at the same time to produce the code rate adaptive signal l, which is also sent to the bound selection 46 to determine the bounds B1 and B2. The code rate adjustor 50 further provides a reset signal RESET for the up/down counter 44.

Figure 9:
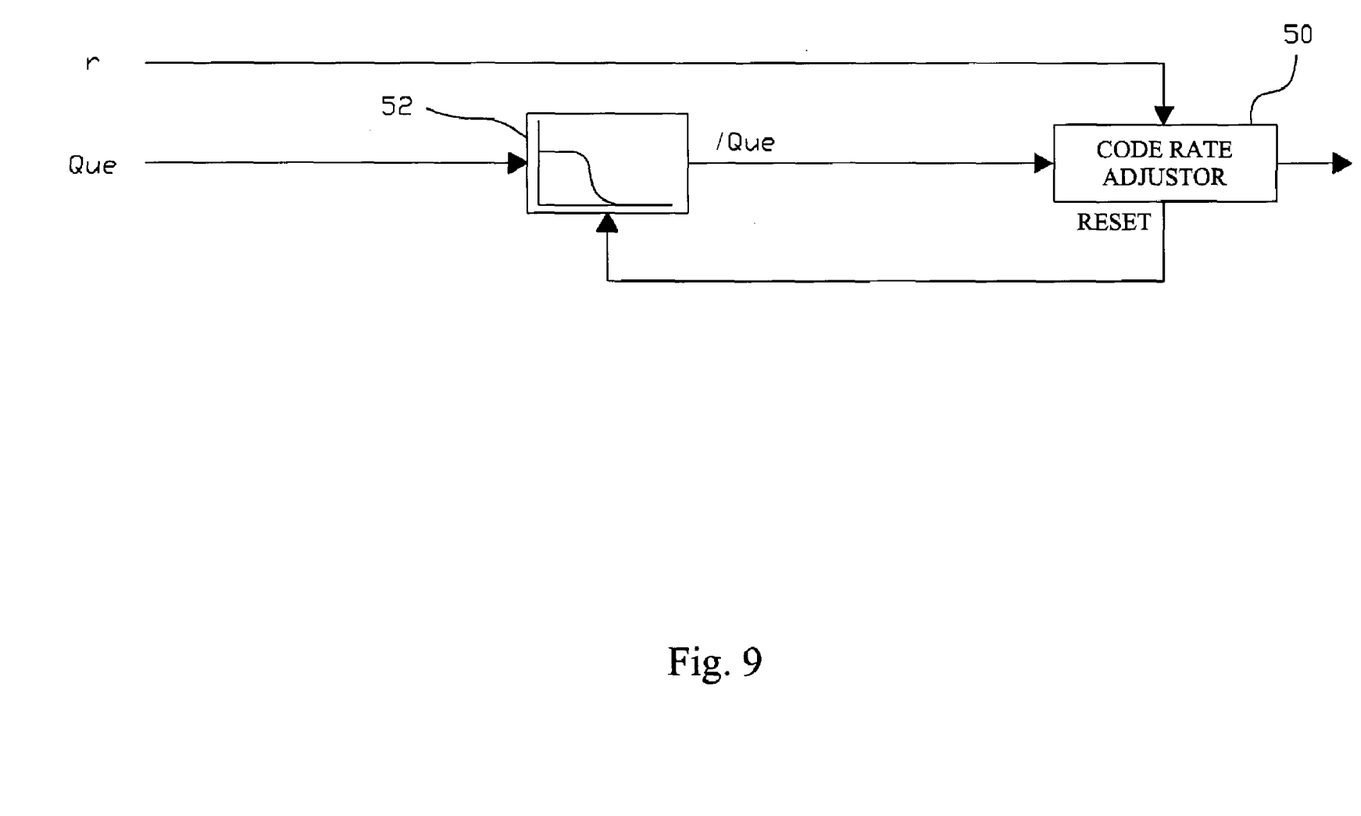
FIG. 9 shows the construction of another code rate adaptor according to the present invention.

Alternatively, in addition to the code capacity indication r, the code rate adaptor 30 directly refers to the quantized prediction error Que, instead of the prediction û. FIG. 9 shows the construction of such code rate adaptor 30, in which the quantized prediction error Que is connected to a low-pass filter or up/down counter 52 to produce an output /Que that is the adjustment indication A for the code rate adjustor 50. Likewise, the other input of the code rate adjustor 50 is the code capacity indication r, and the code rate adjustor 50 also provides a reset signal RESET for the low-pass filter or up/down counter 52. In this apparatus, the code rate adaptor 30 determines the most suitable code length according to the quantized prediction error Que and code capacity.

Figure 10:
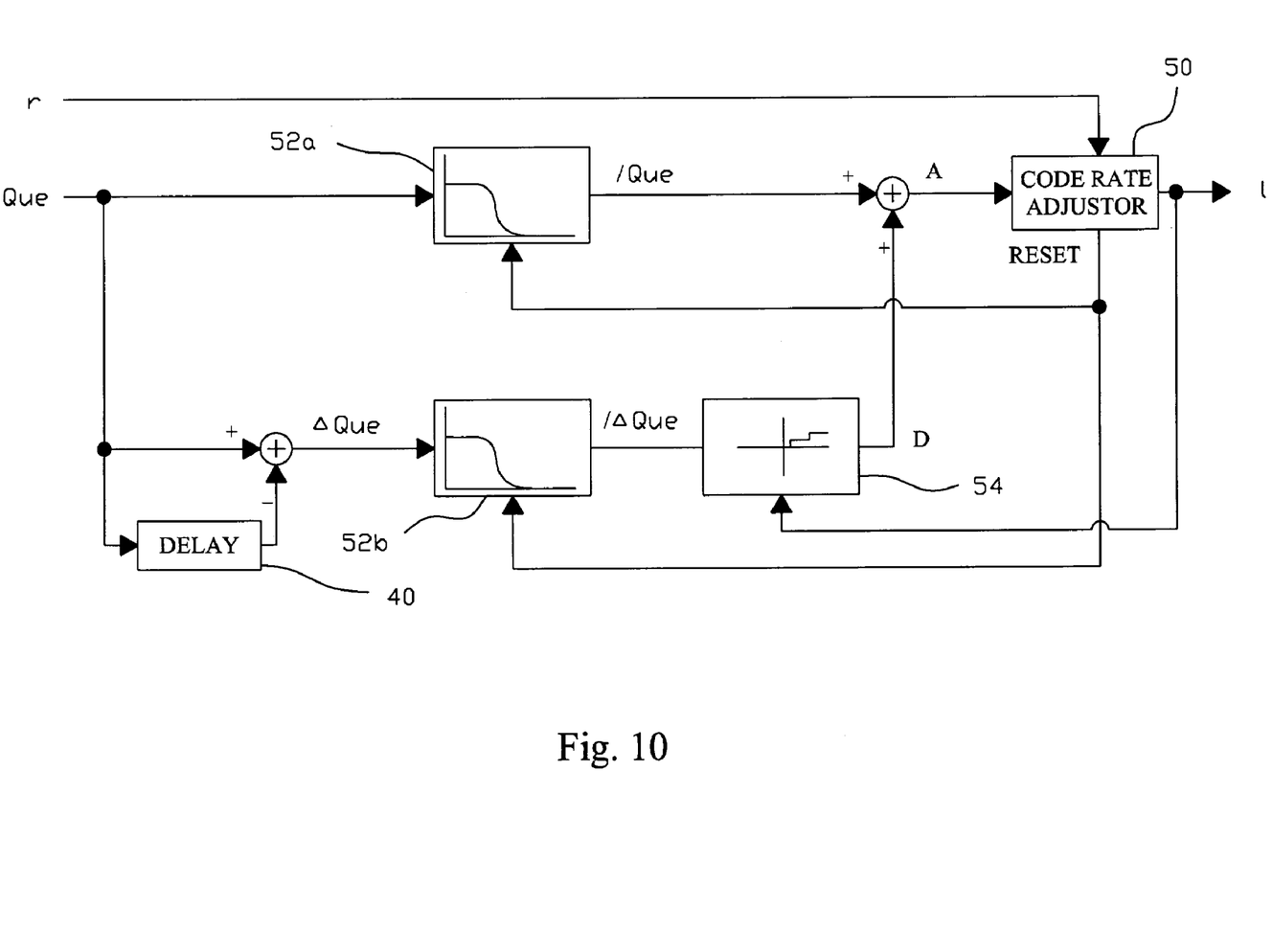
FIG. 10 shows the construction of a further improved code rate adaptor according to the present invention.

A further improved code rate adaptor 30 is shown in FIG. 10. In addition to those shown in FIG. 9, it further includes a delay unit 40 to produce a difference ΔQue between the quantized prediction error Que and its delay. It produces /ΔQue by a low-pass filter or up/down counter 52b and a compensation D by a quantization error compensator 54 to be added to /Que to be the adjustment indication A for the code rate adjustor 50. The additional circuit thereof is used to observe the trend of the quantized prediction error Que. If the differenceΔQue is positive, it means the difference is continuously increasing, and the code length is not enough and should be increased; on the other hand, if the differenceΔQue is negative, it means the difference is continuously decreasing, and the code length is enough or over and should decreased or kept.

Figure 11:
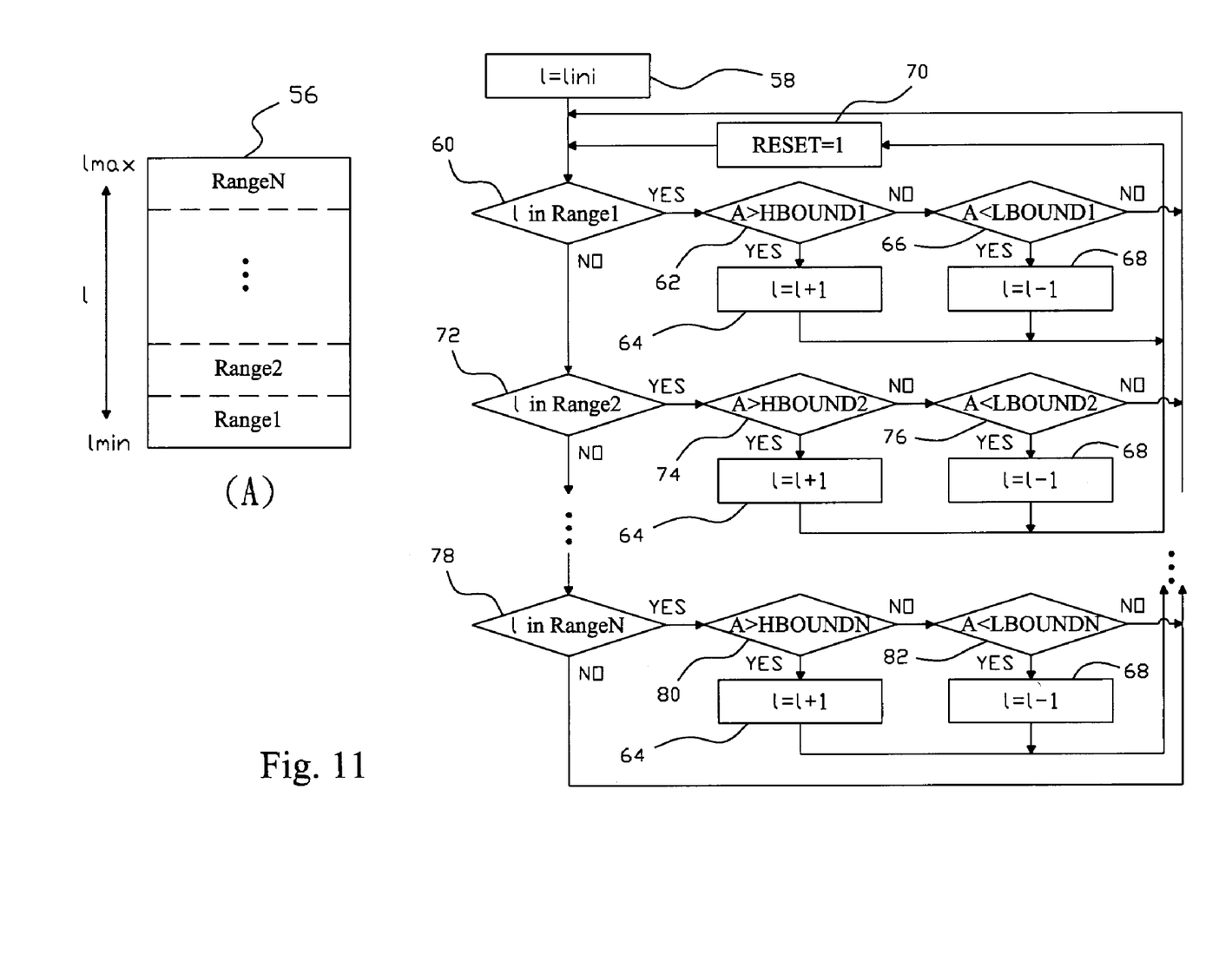
FIG. 11 shows an embodiment control flow according to the present invention.

FIG. 11 shows an embodiment control flow, in which FIG. 11(A) shows N ranges are defined for the value 56 of the code length l, i.e., Range1, Range2, . . . , RangeN. The width of each range can be equal or different, and the code length is gradually increased from the smallest Range1 to the largest RangeN. The principle of the control method is described in the following. At first, the system is given an initial code length lini in step 58. Then step 60 checks if the code length l is in Range1. If it is, then step 62 checks if the adjustment indication A exceeds bound HBOUND1. If it does, then the code length l is added by 1 in step 64, jumps to step 70 to reset, and back to step 60; otherwise goes to step 66 to check if the adjustment indication A is lower than bound LBOUND1. If it is, then the code length l is decreased by 1 in step 68, jumps to step 70 to reset, and back to step 60; otherwise directly goes to step 60. Steps 62 to 68 in the above described are for the adjustment method for the code length l in Range1. If the result of step 60 is false, it means the code length l exceeds over Range1, then goes to step 72 to check if the code length l is in Range2, and the following process is similar to that for Range1 in the above described, only that the adjustment indication A is compared with a different bound range. In detailed, if the adjustment indication A exceeds bound HBOUND2 in step 74, then the code length l is added by 1 in step 64; otherwise if the adjustment indication A is lower than bound LBOUND2 in step 76, then the code length l is decreased by 1 in step 68. After completing the adjustment for this range, similarly, goes to step 70 to reset and back to step 60. The processes for the other ranges are the same as that in the above described. However, in the comparison of the last range, if the code length l is checked in step 78 to be in RangeN, then goes to step 80, and if the adjustment indication A exceeds over bound HBOUNDN, then the code length l is added by 1 in step 64; otherwise if the adjustment indication A is lower than bound LBOUNDN in step 82, then the code length l is decreased by 1 in step 68. After completing the adjustment of the code length l, goes to step 70 to reset and back to step 60. If the adjustment indication A is checked lower than bound LBOUNDN in step 82, or the code length l is checked not in RangN in step 82, it directly goes to step 60 to start checking the range the code length l is present.

Figure 12:
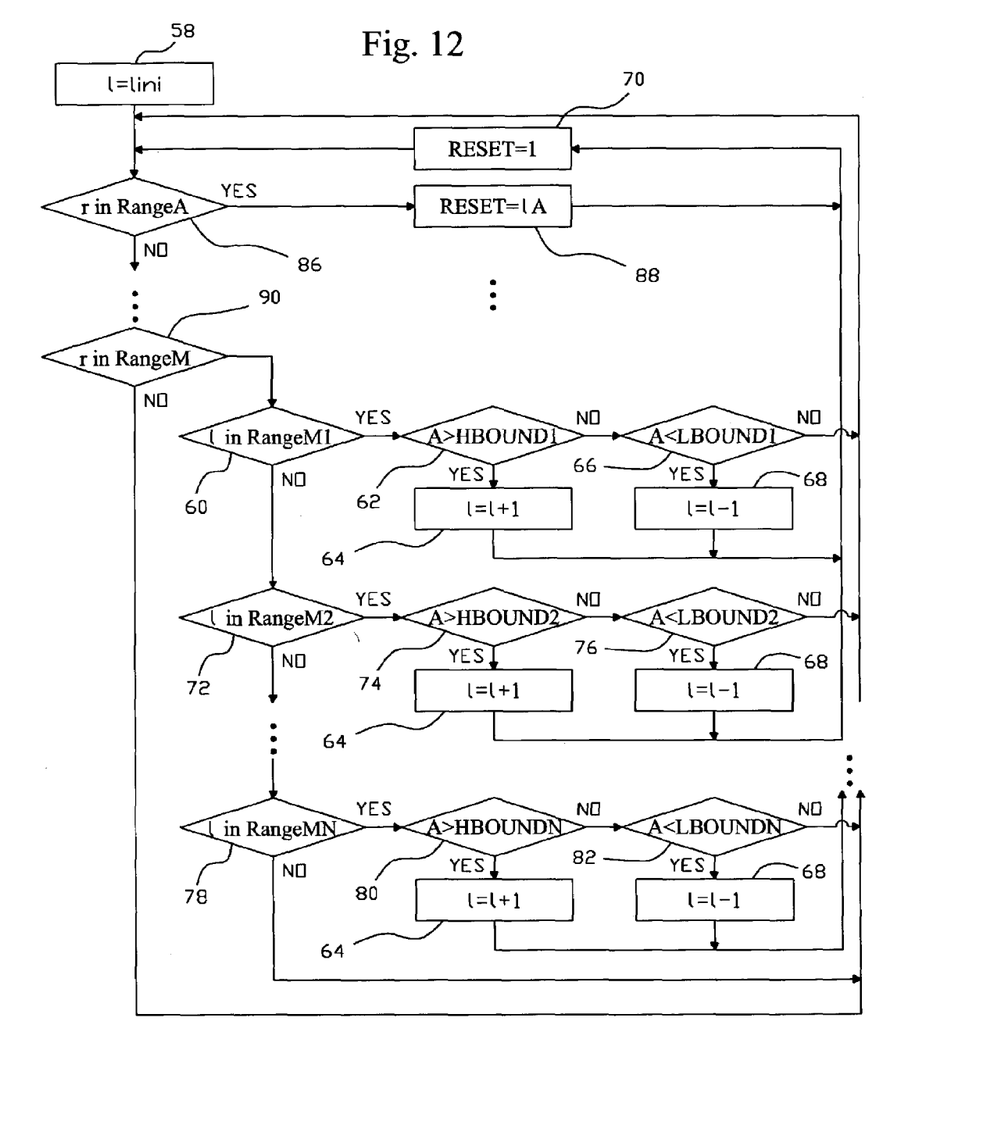
FIG. 12 shows another embodiment control flow according to the present invention.

Another embodiment control flow is shown in FIG. 12, in which RangeA, RangeB, . . . , RangeM are defined for the code capacity r from empty to full, as shown in FIG. 12(A). The width of each range can be equal or different. For each range, for example RangeX, of code capacity r, N ranges, i.e., RangeX1, RangeX2, . . . , RangeXN are further defined for the value 56 of the corresponding code length l. Likewise, the width of each range for the code length l corresponding to a specific range of the code capacity r can be equal or different, and the code length is gradually increased from the smallest RangeX1 to the largest RangeXN, as shown in FIG. 12(B). In this embodiment, as that in the previous one, an initial code length lini is given in step 58 at first, and then adjusts the code length l according to the range where the code capacity r is present and the range where the code length l is present. In step 86, if the code capacity r is in RangeA, the system adjusts the code length l in RangeA by the operation lA in step 88, goes into step 70 to reset, and back to step 86. By the similar process, the range of the code capacity r is checked step by step till the last range in step 90. In the last range, the detailed process of adjusting the code length l is shown in FIG. 12, which is the same as that shown in FIG. 11. The other adjustment processes for the other ranges of the code capacity r are similar to this process. On the other hand, in step 90, if the code capacity r is not in RangeM, it directly jumps back to step 86 to start checking the range the code capacity r is present.

To illustrate the variation of the code capacity r to adjust the code length l, a buffer memory at receiver to store code is assumed and thought to be a leaking bucket. Code is filled into the bucket from its top and taken out from its bottom, that is, the buffer is operated by first-in first-out (FIFO). The flow of the code added into the buffer memory may be almost stable or very unstable, depending on the actual applications and the practice at that time. Generally, the flow of the code taken from the buffer is almost stable. However, it could be unstable for some applications or some reasons, depending on the actual applications and the practice at that time. In the practice of a CD-ROM drive, for example, data from music CD are pushed into the buffer memory, and the data stored in the buffer memory is retrieved therefrom to recover the music. When the CD-ROM drive shocked, the code capacity filled into the buffer memory will immediately stop or violently change. For another example, in a communicating system, the bandwidth of the transmission channel is limited. If a sudden interference resulted from accident affair occurres, the code flow received by receiver may suddenly lower. For a further example, in a communicating system, the transmission quality of the channel may be unstable, and, as a result, the signal flow received by receiver will be large-and-small or swinging. For such applications, if the code length or encoding speed is kept constant, it will be happened that the receiver buffer appears empty, and thus the system cannot be operated smoothly, especially in the system of instantaneity or media related, such as music, video and interactive system, and the degraded performance will make users inpatient. The invented arrangement and method dynamically regulats the code length or encoding speed according to actual situations, and thereby improves the system performane by keeping the system stably operated.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A code rate adaptive encoding arrangement for a pulse code modulation system comprising:

a quantizer for quantizing a prediction error derived from subtracting a prediction from an input to produce a quantized prediction error;

a predictor for producing said prediction based on a quantized input derived from a summation of said prediction and said quantized prediction error;

an encoder for encoding said quantized prediction error to produce a code signal, said encoder coupled to a receiving device and providing said code signal thereto;

a code capacity meter coupled to said receiving device for retrieving a receiver code signal therefrom, said code capacity meter producing an indication of a code capacity from a measurement of said code signal and said receiver code signal; and a code rate adaptor for producing a code rate adaptive signal based on said prediction and said code capacity indication, said code rate adaptor coupled to said quantizer and said encoder for providing said code rate adaptive signal thereto, wherein said quantizer and said encoder modify a code length of said code signal responsive to said code rate adaptive signal during an encoding process.

2. The arrangement according to claim 1, wherein said code capacity meter includes an accumulator for producing a buffered code bit quantity from a difference between said code signal and receiver code signal to determine said code capacity indication.

3. The arrangement according to claim 2, wherein said code capacity meter further includes a code capacity quantizer for quantizing said buffered code bit quantity.

4. The arrangement according to claim 1, wherein said code capacity meter includes:

two one-shot triggers respectively connected with said code signal and receiver code signal for counting an encoding number and a decoding number; and a counter connected with said encoding number and decoding number for producing a number difference between said encoding number and decoding number to determine said code capacity indication.

5. The arrangement according to claim 4, wherein said code capacity meter further includes a code capacity quantizer for quantizing said number difference.

6. The arrangement according to claim 1, wherein said code rate adaptor includes:
a bound selector for producing a first and second bounds from said code rate adaptive signal;
an up/down counter for producing a counter signal by comparing said first bound with a differential of said prediction; and
a code rate adjustor for producing said code rate adaptive signal by comparing said second bound with said counter signal.

7. A code rate adaptive decoding arrangement for a pulse code modulation system comprising:
a decoder coupled to a receiver path and decoding a code signal received therefrom to a quantized prediction error;
a predictor for producing a prediction; and
a code rate adaptor for producing a code rate adaptive signal based on said prediction and a code capacity indication received via said receiver path, said code rate adaptor coupled to said decoder for providing said code rate adaptive signal thereto, wherein said decoder modifies a code length of said code signal during a decoding process.

8. The arrangement according to claim 7, wherein said code rate adaptor includes:
a bound selector for producing a first and second bounds from said code rate adaptive signal;
an up/down counter for producing a counter signal by comparing said first bound with a differential of said prediction; and
a code rate adjustor for producing said code rate adaptive signal by comparing said second bound with said counter signal.

9. A code rate adaptive encoding arrangement for a pulse code modulation system comprising:
a quantizer for quantizing a prediction error derived from subtracting a prediction from an input to produce a quantized prediction error;
a predictor for producing said prediction based on a quantized input derived from a summation of said prediction and said quantized prediction error;
an encoder for encoding said quantized prediction error to produce a code signal, said encoder coupled to a receiving device and providing said code signal thereto;
a code capacity meter coupled to said receiving device for retrieving a receiver code signal therefrom, said code capacity meter producing a code capacity indication from a measurement of said code signal and said receiver code signal;
a code rate adaptor for producing a code rate adaptive signal based on said quantized prediction error and said code capacity indication, said code rate adaptor coupled to said quantizer and encoder to modify a code length of said code signal responsive to said code rate adaptive signal during an encoding process.

10. The arrangement according to claim 9, wherein said code capacity meter includes an accumulator for producing a buffered code bit quantity from a difference between said code signal and receiver code signal to determine said code capacity indication.

11. The arrangement according to claim 10, wherein said code capacity meter further includes a code capacity quantizer for quantizing said buffered code bit quantity.

12. The arrangement according to claim 9, wherein said code capacity meter includes:
two one-shot triggers respectively connected with said code signal and receiver code signal for producing an encoding number and a decoding number; and
a counter connected with said encoding number and decoding number for producing a number difference between said encoding number and decoding number to determine said code capacity indication.

13. The arrangement according to claim 12, wherein said code capacity meter further includes a code capacity quantizer for quantizing said number difference.

14. The arrangement according to claim 9, wherein said code rate adaptor includes:
a low-pass filter or up/down counter for producing a counter signal from said quantized prediction error to thereby determine an adjustment indication; and
a code rate adjustor for producing said code rate adaptive signal from said adjustment indication and code capacity indication.

15. The arrangement according to claim 14, wherein said code rate adaptor further includes:
a second low-pass filter or up/down counter for producing a counter trend signal from a differential of said quantized prediction error; and
a quantization error compensator for producing a compensation signal from said counter trend signal to compensate said adjustment indication.

16. A code rate adaptive decoding arrangement for a pulse code modulation system comprising:
a decoder coupled to a receiver path and decoding a code signal received therefrom to a quantized prediction error;
a predictor for producing a prediction; and
a code rate adaptor for producing a code rate adaptive signal based on said quantized prediction error and a code capacity indication received via said receiver path, said code rate adaptor coupled to said decoder for providing said code rate adaptive signal thereto, wherein said decoder modifies a code length of said code signal during a decoding process.

17. The arrangement according to claim 16, wherein said code rate adaptor includes:
a low-pass filter or up/down counter for producing a counter signal from said quantized prediction error to thereby determine an adjustment indication; and
a code rate adjustor for producing said code rate adaptive signal from said adjustment indication and said code capacity indication.

18. The arrangement according to claim 17, wherein said code rate adaptor further includes:
a second low-pass filter or up/down counter for producing a counter trend signal from a differential of said quantized prediction error; and
a quantization error compensator for producing a compensation signal from said counter trend signal to compensate said adjustment indication.

19. A code rate adaptive encoding method for a pulse code modulation system, comprising the steps of:
quantizing a prediction error derived from subtracting a prediction from an input to produce a quantized prediction error;

producing said prediction based on a quantized input derived from a summation of said prediction and said quantized prediction error;

encoding said quantized prediction error for producing a code signal;

providing said code signal to a receiving device subject to a code capacity;

retrieving a receiver code signal from said receiving device;

producing an indication of said code capacity from said code signal and said receiver code signal;

producing a code rate adaptive signal based on said prediction and said code capacity indication; and determining a code length for said code signal in accordance with said code rate adaptive signal.

20. The method according to claim 19, further comprising producing a buffered code bit quantity from a difference between said code signal and said receiver code signal for determining said code capacity indication.

21. The method according to claim 20, further comprising quantizing said buffered code bit quantity.

22. The method according to claim 19, further comprising counting a number difference between an encoding number and a decoding number for determining said code capacity indication.

23. The method according to claim 22, further comprising quantizing said number difference.

24. The method according to claim 19, further comprising determining said code rate adaptive signal based on a differential of said prediction and at least one bound.

25. The method according to claim 24, further comprising determining said at least one bound according to said code rate adaptive signal.

26. The method according to claim 19, wherein said producing a code rate adaptive signal includes the steps of:
defining a plurality of ranges for said code length, each of said plurality of ranges having a high bound and a low bound; and
comparing said code length with said high bound and low bound of one of said plurality of ranges for increasing or decreasing said code length.

27. The method according to claim 19, wherein said producing a code rate adaptive signal includes the steps of:
defining a plurality of ranges for said code capacity indication, each of said plurality of ranges corresponding to a plurality of ranges of said code length, each of said plurality of ranges of said code length having a high bound and a low bound; and
comparing said code length with said high bound and low bound of one of said plurality of ranges of said code length corresponded one of said plurality of ranges of said code capacity indication for increasing or decreasing said code length.

28. A code rate adaptive decoding method for a pulse code modulation system, comprising the steps of:
decoding a code signal received through a receiver path to a quantized prediction error;
producing a prediction from a quantized signal;
producing said quantized signal from a summation of said quantized prediction error and said prediction;
receiving a code capacity indication via said receiver path;
producing a code rate adaptive signal based on said prediction and said code capacity indication; and
determining a code length for said code signal in accordance with said code rate adaptive signal.

29. The method according to claim 28, further comprising determining said code rate adaptive signal based on a differential of said prediction and at least one bound.

30. The method according to claim 29, further comprising determining said at least one bound according to said code rate adaptive signal.

31. The method according to claim 28, wherein said producing a code rate adaptive signal includes the steps of:
defining a plurality of ranges for said code length, each of said plurality of ranges having a high bound and a low bound; and
comparing said code length with said high bound and low bound of one of said plurality of ranges for increasing or decreasing said code length.

32. The method according to claim 28, wherein said producing a code rate adaptive signal includes the steps of:
defining a plurality of ranges for said code capacity indication, each of said plurality of ranges corresponding to a plurality of ranges of said code length, each of said plurality of ranges of said code length having a high bound and a low bound; and
comparing said code length with said high bound and low bound of one of said plurality of ranges of said code length corresponded one of said plurality of ranges of said code capacity indication for increasing or decreasing said code length.

33. A code rate adaptive encoding method for a pulse code modulation system, comprising the steps of:
quantizing a prediction error derived from subtracting a prediction from an input to produce a quantized prediction error;
producing said prediction based on a quantized input derived from a summation of said prediction and quantized prediction error;
encoding said quantized prediction error for producing a code signal;
providing said code signal to a receiving device subject to a code capacity;
retrieving a receiver code signal from said receiving device;
producing an indication of said code capacity from said code signal and said receiver code signal;
producing a code rate adaptive signal based on said quantized prediction error and said code capacity indication; and
determining a code length for said code signal in accordance with said code rate adaptive signal.

34. The method according to claim 33, further comprising producing a buffered code bit quantity from a difference between said code signal and receiver code signal for determining said code capacity indication.

35. The method according to claim 34, further comprising quantizing said buffered code bit quantity.

36. The method according to claim 33, further comprising counting a number difference between an encoding number and a decoding number for determining said code capacity indication.

37. The method according to claim 36, further comprising quantizing said number difference.

38. The A method according to claim 33, further comprising producing an adjustment indication based on said quantized prediction error for determining said code rate adaptive signal.

39. The method according to claim 38, further comprising producing a counter trend signal from a differential of said quantized prediction error for further producing a compensation signal to compensate said adjustment indication.

40. The method according to claim 33, wherein said producing a code rate adaptive signal includes the steps of:
defining a plurality of ranges for said code length, each of said plurality of ranges having a high bound and a low bound; and
comparing said code length with said high bound and low bound of one of said plurality of ranges for increasing or decreasing said code length.

41. The method according to claim 33, wherein said producing a code rate adaptive signal includes the steps of:
defining a plurality of ranges for said code capacity indication, each of said plurality of ranges corresponding to a plurality of ranges of said code length, each of said plurality of ranges of said code length having a high bound and a low bound; and
comparing said code length with said high bound and low bound of one of said plurality of ranges of said code length corresponded one of said plurality of ranges of said code capacity indication for increasing or decreasing said code length.

42. A code rate adaptive decoding method for a pulse code modulation system comprising the steps of:
decoding a code signal received through a receiver path to a quantized prediction error;
producing a prediction from a quantized signal;
producing said quantized signal from a summation of said quantized prediction error and said prediction;
receiving a code capacity indication via said receiver path; and
producing a code rate adaptive signal based on said quantized prediction error and said code capacity indication: and
determining a code length for said code signal in accordance with said code rate adaptive signal.

43. The method according to claim 42, further comprising producing an adjustment indication based on said quantized prediction error for determining said code rate adaptive signal.

44. The method according to claim 43, further comprising producing a counter trend signal from a differential of said quantized prediction error for further producing a compensation signal to compensate said adjustment indication.

45. The method according to claim 42, wherein said producing a code rate adaptive signal includes the steps of:
defining a plurality of ranges for said code length, each of said plurality of ranges having a high bound and a low bound; and
comparing said code length with said high bound and low bound of one of said plurality of ranges for increasing or decreasing said code length.

46. The method according to claim 42, wherein said producing a code rate adaptive signal includes the steps of:
defining a plurality of ranges for said code capacity indication, each of said plurality of ranges corresponding to a plurality of ranges of said code length, each of said plurality of ranges of said code length having a high bound and a low bound; and
comparing said code length with said high bound and low bound of one of said plurality of ranges of said code length corresponded one of said plurality of ranges of said code capacity indication for increasing or decreasing said code length.

* * * * *